Figure 1:
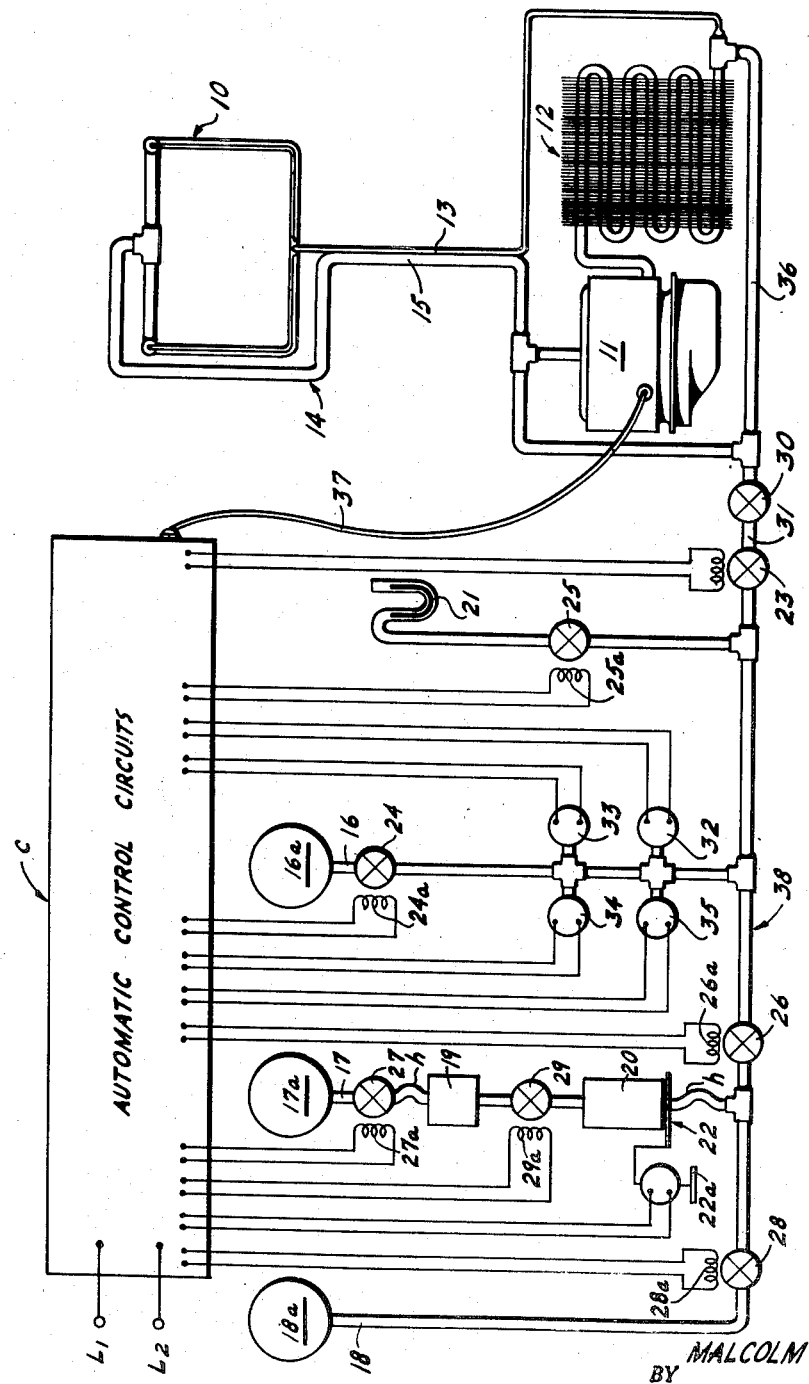

Feb. 28, 1950

M. G. SHOEMAKER 2,499,170

CHARGING APPARATUS

Filed Oct. 15, 1947

2 Sheets-Sheet 1

INVENTOR.
MALCOLM G. SHOEMAKER
BY
Brown, Denk & Synnestvedt
AGENTS

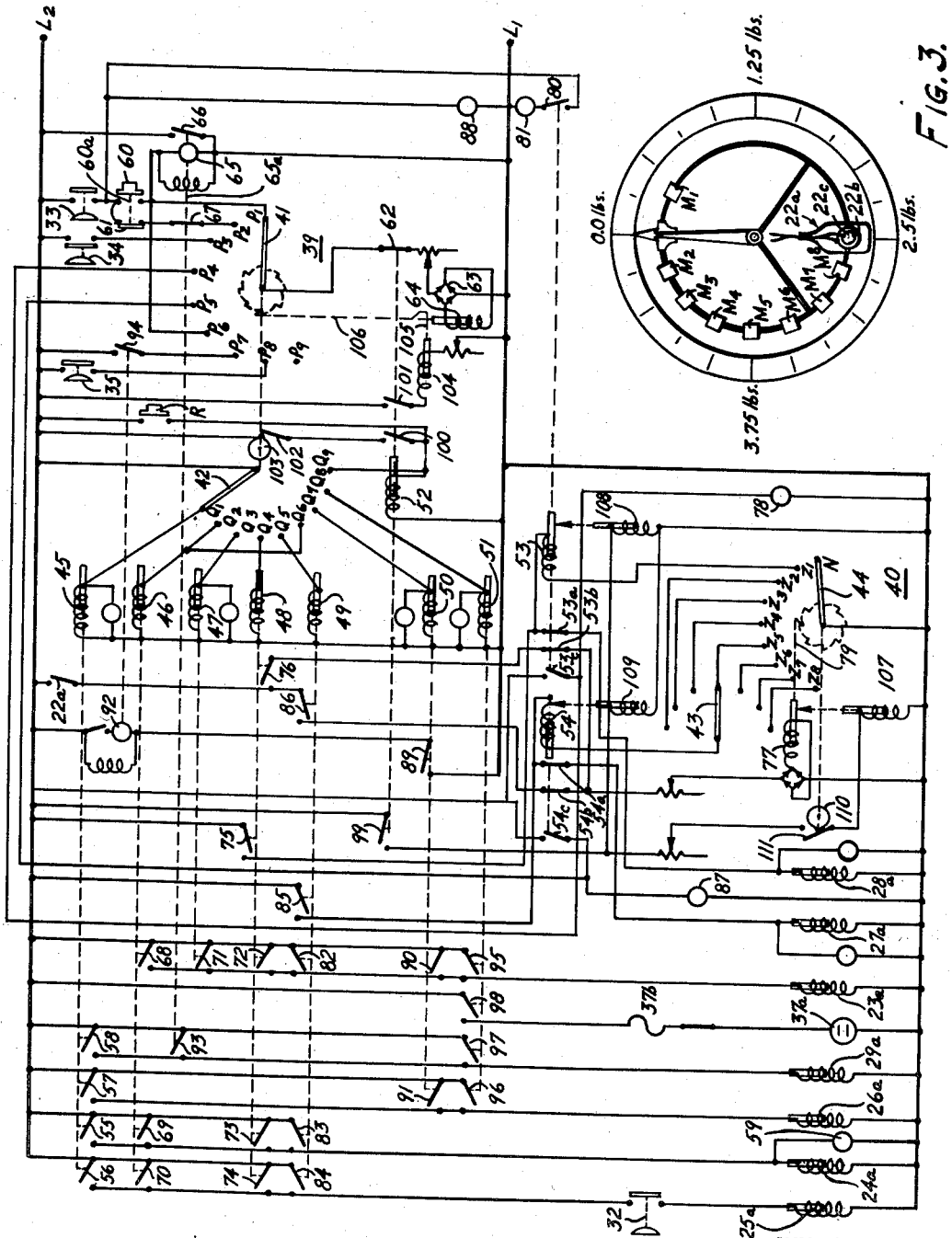

Patented Feb. 28, 1950

2,499,170

UNITED STATES PATENT OFFICE 2,499,170

CHARGING APPARATUS

Malcolm G. Shoemaker, Doylestown, Pa., assignor to Philco Corporation, Philadelphia, Pa., a corporation of Pennsylvania Application October 15, 1947, Serial No. 780,082

14 Claims. (Cl. 62—115)

The present invention relates to charging and, more particularly, is concerned with a method of and apparatus for charging a refrigeration system, or the like, with desired predetermined quantities of lubricant and refrigerant.

Known charging systems have been subject to difficulties and disadvantages, the nature of which will appear with more particularity from what follows, after an understanding is had of the functions required of such charging apparatus.

Firstly, and considering the invention as applied to the charging of refrigerator sealed units, the unit must first be dehydrated, to remove any moisture therefrom in order to prevent the occurrence of freezing at the expansion point of the flow regulating device. Dehydration, prior to the charging operation, has been accomplished in this art in several different ways and, for the purposes of the present invention, it is preferred to use the vacuum system of dehydration, at an elevated temperature. In order to insure that no moisture or non-condensible gases enter the system after this dehydration and before charging, the unit is filled with gas, preferably dichlorodifluoromethane, to a pressure somewhat above atmospheric in order that, after reduction to room temperature, the pressure in the refrigerator system will be in the neighborhood of five pounds gauge, or above. This gas must be removed prior to the initiation of the charging cycle, to provide uniform conditions for charging and also to insure that the minimum amount of non-condensible gases remain in the unit or system.

Known charging apparatus is of the manually controlled and operated type and requires the manipulation of a relatively large number of valves, testing devices, and the like, during the charging operation. The constant attention of the operator is, of course, necessary. The known techniques are inherently of such a nature as to introduce manifold opportunity for errors on the part of the operator, which errors may result in an improperly or insufficiently charged system. For example, the operator may not allow sufficient time to reach the specified vacuum, and in this way the units may prove faulty. Similarly, if the valves are not properly manipulated and the time of the manipulations is not closely controlled, variation in the charge may result. Not infrequently it has been found that units have been started in operation before sufficient lubrication is supplied to the compressor, thus damaging the bearing surfaces.

With the foregoing difficulties and disadvantages in mind, it is a primary object of the present invention to provide charging apparatus of such a nature that its operation may be fully automatic, and in the use of which the operator need exercise a minimum of control during each complete charging sequence.

With more particularity, the invention is characterized by the provision of charging apparatus automatically operable to perform, inter alia, the following functions, comprising a preferred charging procedure which results in almost complete elimination of production "rejects": (a) evacuate the charging apparatus; (b) test the refrigeration apparatus for leakage; (c) evacuate the refrigeration apparatus; (d) meter out predetermined quantities of constituents including lubricant and refrigerant; (e) charge the refrigeration apparatus with said constituents; (f) initiate operation of the refrigeration apparatus to draw any residual constituents from the charging apparatus and to insure proper lubrication prior to operation under full load; (g) terminate operation of the refrigeration system or unit and recondition the charging appartus to repeat the sequence when a succeeding refrigeration unit is associated with said charging apparatus.

The present invention also has as an object the provision of apparatus in which maintenance requirements are greatly reduced.

It is a further object to provide apparatus of the above character in which exact, predetermined amounts of refrigerant and lubricant are supplied to the refrigerating apparatus, regardless of changes in ambient temperature.

In another aspect of the present invention, it is an object to provide charging apparatus of such character as to obviate the necessity for utilizing constituent receptacles of precise volume.

In a method aspect, it is an object of the invention to charge refrigeration apparatus, and the like, by driving one charge constituent into the apparatus under the influence of the volatilization of another constituent, and then operating the unit, whereby to withdraw any residual charge constituents into the apparatus at a predetermined low pressure.

The invention also has as an object the provision of apparatus of such a nature as materially to reduce both the charging time and the possibility of errors arising from the human element.

The manner in which the foregoing and other objects and advantages may best be realized will become clear from a consideration of the following description, taken in the light of the accompanying drawings, in which there is illustrated a preferred embodiment of the invention.

In the drawings:

Figure 1 is a somewhat diagrammatic illustration of apparatus constructed in accordance with the present invention, the apparatus being shown as having associated therewith a sealed refrigeration unit of standard type;

Figure 2 is a schematic diagram illustrating in detail the automatic control circuits and associated devices, represented diagrammatically in Figure 1, and which circuits cooperate with and provide automatic operation of the charging components shown in Figure 1; and, Figure 3 is a somewhat diagrammatic view of a weight-responsive switching device preferably employed in the apparatus of the invention.

Now making more detailed reference to the drawings, and particularly to Figure 1 thereof, there is illustrated, by way of example, a refrigerator sealed unit of the type including an evaporator 10, a compressor 11 and a condenser 12, which components are connected in series flow circuit by conduits including a capillary tube 13 and a suction line 14, which latter, in accordance with usual practice, has a portion 15 disposed in heat exchange relation with a section of the capillary tube 13. Since the invention is not concerned with the refrigeration unit, per se, and since such units are well known in this art, further and more detailed description of this unit is not necessary herein.

The charging apparatus illustrated in Figure 1 includes three conduits or lines 16, 17 and 18. The conduit 16 leads to a vacuum pump, shown diagrammatically at 16a, and which may be of any desired type; the conduit 17 is connected to a receptacle 19, serving to deliver thereto fluid refrigerant from a supply vessel indicated at 17a; and the conduit 18 is in communication with the receptacle 20 and it is through this latter conduit that lubricant is supplied to said receptacle from a source of lubricant shown at 18a.

The apparatus further includes a manometer 21, employed during the evacuation process, and weighing apparatus diagrammatically indicated at 22 and through the agency of which the desired predetermined quantities of lubricant and refrigerant are established prior to charging of the system. While the quantities of refrigerant and lubricant are preferably determined in terms of weight, in the broader aspect of the present invention determination on a volumetric basis is also contemplated. The weighing apparatus, which may comprise any desired scale of proper range and sufficient accuracy, has associated therewith a switch device shown at 22a, which device cooperates in the automatic operation of the overall apparatus, as will clearly appear from what follows.

A number of valve devices are also included, these devices being shown at 23, 24, 25, 26, 27, 28 and 29. For the purposes of this invention, these valve devices may take any desired known form, and preferably are of solenoid actuated type, and the operation thereof is controlled by the automatic control circuits represented in Figure 1 and illustrated in detail in Figure 2. For the purposes of this portion of the description, it is sufficient to point out that these valves are actuated, respectively, by the solenoids and associated armatures which appear in the lower right hand portion of Figure 2 and bear corresponding reference numbers followed by the subscript "a". These solenoids also appear adjacent the valves, in Figure 1, it being understood that the armature, physically, is within the valve casing. If desired, and within the purview of my invention, the valve devices 23 to 29, inclusive, may be actuated by suitable auxiliary mechanism, for example, by air under pressure, which auxiliary mechanism would, in turn, be responsive to the solenoid and armature assemblies shown at 23a to 29a.

A processing valve 30 is normally associated with the unit prior to its connection to the charging apparatus, and serves to connect said unit to a terminal conduit 31 leading from the valve 23.

A number of pressure responsive switch devices are also employed, these being illustrated diagrammatically by the reference characters 32 to 35, inclusive. These pressure-responsive switches cooperate with portions of the automatic control circuits (represented at C in Figure 1 and shown in detail in Figure 2) in a manner which will be fully understood as the description proceeds.

An understanding of the overall apparatus will be facilitated by a brief initial description of the functioning of the components shown in Figure 1, after which such components and the functions thereof will be correlated with the sequence-controlling mechanism presently to be described.

A refrigeration apparatus or unit is connected to the charging mechanism by coupling processing valve 30 to the terminal extension 31. The valve devices 23 to 29, inclusive, are of the normally closed type, and the automatic control circuits C serve to open said valve devices in a sequence determined by the several steps in the evacuation and charging procedure. Initially, the valves 24, 25, 26 and 29 are opened and the charging board is evacuated, through line 16, to a predetermined pressure as indicated by manometer 21. Valve 24 is then closed and the reading of the manometer is noted to determine if any change in reading has occurred which would indicate leakage in the charging board conduits. Following this, valve 25, leading to the manometer, is closed and the processing valve 30 is opened, under which condition pressure switch 32 is subjected to the pressure in the unit and, if this pressure is within limits, the charging apparatus proceeds automatically. If this pressure is not found to be within predetermined limits, the charging is interrupted until it be determined whether or not leaks are present in either the charging apparatus or the unit.

Valve 24 in the vacuum line is reopened at this time and evacuation of the unit is initiated. Concurrently with the evacuation process, valves 27 and 28 are opened and refrigerant and lubricant are fed to the corresponding receptacles 19 and 20. In practice, the lubricant is first introduced and, as will later appear, the switch 22a is automatically responsive to supply of a predetermined weight of lubricant to terminate supply thereof and to initiate supply of the refrigerant through conduit 17 and valve 27. The switch 22a is further responsive to supply of the desired quantity of refrigerant, by weight, to terminate supply of said refrigerant and thereafter to close the valve 24, and to open the valve 26 to accommodate delivery of the charge constituents to the unit. Prior to such delivery, however, the unit processing tube 36 is "pinched-off."

In order to force the lubricant into the unit, the valve 29, located between the receptacles 19 and 20, is opened momentarily thereby establishing communication between the receptacles and delivering the lubricant to the unit under pressure of the vaporizable refrigerant in receptacle 19. When all of the lubricant has been delivered to the unit, valve 29 is reopened and operation of the compressor is started by supplying power to the line cord 37 thereby drawing residual charging constituents into the unit until the pressure in the unit, and in those portions of the charging apparatus which are in communication therewith, have reached a predetermined rated pressure. In this way a uniform amount of charge is insured.

Closing of the processing valve 30 completes the procedure, after which the unit is disconnected from the terminal conduit or extension 31.

In particular accordance with this invention, this novel charging procedure is effected in an automatic manner, as will now be described with especial reference to Figure 2.

The circuit shown in Figure 2 is the electrical system for operating the valves 23 to 29, inclusive, and energizing the power cord 37 of the motor compressor. In the interest of brevity in description, the operation of the circuit will be described concurrently with indication of the circuit components included.

Electric power, suitable for actuation of the control circuits and for energization of the compressor motor, is supplied to terminals $L_1$ and $L_2$ of the circuit. The operation of the circuit is such that the valves 23 to 29 are operated in the required predetermined order and in an established sequence, each step in the sequence being initiated upon completion of the previous step. In general, the system of Figure 2 consists of: a stepping relay 39; a second stepping relay or switch 40; a plurality of valve control switches; and certain magnetic actuators employed to actuate the valve control switches. Stepping relay 39 has two constactors or arms 41 and 42, mechanically ganged as indicated in the drawing, arm 41 being used to complete the circuits necessary to step the relay to prepare it for the next operation, and arm 42 serving to actuate the valve control switches in the desired predetermined sequence. There is also provided an arm 43, which is manually adjustable and is used to preestablish the amount of refrigerant charge in accordance with the type of unit to be processed. Of the above-mentioned relays, those shown at 45 to 51, inclusive, are adapted to operate the valve control switches and thus to actuate the valves 23 to 29 through energization of the solenoid and armature assemblies 23a to 29a. Another relay 52 serves to reset the switch 39 to its initial position, as will presently appear, while a relay shown at 53 is used to provide an indication of the completion of certain operations, as well as to switch certain auxiliary circuits. The relay shown at 54 has its armature operatively associated with switch 40 and is used in controlling the amount of refrigerant charge desired.

The various elements of the apparatus are shown in Figure 2 in the positions which they assume at the instant that the charging device has been reset and just before the relay 45 has been actuated to close the switches which it controls. Resetting is accomplished either automatically, by completion of the charging sequence, or manually—at any time in the cycle—by closing the contacts of a reset button shown at R, which returns the stepping switches to the first position. In this initial position, that is, when the charging apparatus is to be evacuated, power from line $L_2$ is applied through arm 42 to relay 45 and thence to line $L_1$. Relay 45, upon actuation, closes switches 55, 56, 57 and 58, in response to downward movement of its armature and through a mechanical linkage, as is apparent from the drawing. Closing of these switches supplies energy to solenoids 24a, 26a and 29a, respectively, which in turn serve to open the valves 24, 26, and 29 and thus to connect the vacuum pump 16a, the oil chamber or receptacle 20 and the refrigerant chamber or receptacle 19 to the manifold 38. The vacuum pump 16a, which is represented diagrammatically and may be of any suitable type, then operates to evacuate manifold 38, and the lubricant and refrigerant receptacles 20 and 19. Preferably, the vacuum pump is of the continuously operating type, and is in communication with the charging apparatus and the system to be charged only when the valve 24 is open. However, as will be understood, the vacuum pump may be operated discontinuously, in which event operation thereof may be initiated manually. The evacuation is continued until the pressure in the manifold 38 reaches a predetermined value, at which value the pressure switch shown at 32 is set to operate. Pressure switch 32 then closes, energizing solenoid 25a and thus opening valve 25 which connects manometer 21 in the system, permitting checking of the pressure conditions. A pressure valve (represented in Figure 2 at 33) has a pair of contacts which are closed when the system has been evacuated to the required predetermined pressure. This serves to energize point $P_2$ of stepping switch 39, and thus to condition the system for the next operation.

The purpose of this evacuation just described is to establish a fixed initial pressure in a known volume, so that the remaining pressure in the unit being charged can be checked and any leakage recognized. Along with the commencement of this first operation, the lamp 59 is lighted, concurrently with energization of solenoid 24a, and upon completion of the operation a lamp, shown at 88 in the right hand portion of Figure 2, is illuminated to indicate that the system is ready for further operation. The operator then closes starting switch 60, which operation opens a pair of contacts 61, through a mechanical linkage shown at 60a. This operation of switch 60 energizes arm 41 of switch 39 and applies current through switch contacts 62 to rectifier 63 and to the stepping winding 64 of switch 39. Stepping winding 64 then moves arm 41 from contact point $P_1$ to contact point $P_2$. The closing of starting switch 60 also energizes a timing motor, shown at 65, which is so constructed that, upon being actuated, it operates a mechanical shaft 65a which closes switches 66 and 93, and opens the switch shown at 67. The shaft then rotates one full revolution in a predetermined time, after which switches 66 and 93 are opened, switch 67 is closed, and rotation of the shaft 65a is stopped. The present invention is not concerned with the timer, per se, and since such devices are now well known, further and more detailed illustration and description are not necessary herein. However, attention is directed to the fact that this timer may be of the type supplied by Eagle Signal Co., and designated No. HA12A6–B242.

Concurrently with movement of arm 41 of switch 39 to point $P_2$, arm 42—being mechanically ganged with arm 41—moved from the point designated $Q_1$ to point $Q_2$. This movement energizes relay 46 which, upon actuation, closes switches 68, 69 and 70. It should be understood that switches 57 and 58, which were closed during the previous operation, are now opened as result of the de-energization of relay 45. Switch 68 energizes solenoid 23a, opening valve 23 and connecting the refrigeration apparatus or unit to the manifold 38. Process valve 30 on the unit having previously been opened, the charge of gas in the unit is now permitted to equalize the pressure in the unit and in the manifold 38. The gas pressure in the system being equalized, and if it is within limits, pressure switch 33 is closed to energize point $P_2$ on switch 39 as above described. This contact point $P_2$, however, is only energized after the timer 65 has completed its cycle and has permitted contacts 67 to reclose. This provides a time delay insuring that, after the unit with its residual gas has been connected to the manifold, the vacuum pump 16a will have sufficient time to evacuate the system, this evacuation occurring as a result of switches 69 and 70, and their corresponding valves, having been closed concurrently with the above-mentioned closing of switch 68. Following this, stepping winding 64 actuates a hook member 106 and moves arms 41 and 42 of stepping relay 39 to the third position, that is, the position indicated by points $P_3$ and $Q_3$, and now to be described.

In the third position, in which the evacuation of the unit itself is checked, only switch 71 is closed, by the energization of relay 47. The vacuum pump 16a has been disconnected, but the unit remains connected to the manifold 38, by virtue of the actuation of valve 23. If the evacuation has been sufficient to bring the pressure in the unit within the range necessary to operate a pressure switch shown at 34 in Figures 1 and 2, contact $P_3$ will be energized and the switch 39 will be stepped to the fourth position.

The fourth position (points $P_4$ and $Q_4$) provides for delivery of the lubricant from vessel 18a to the receptacle 20. Switches 72, 73 and 74 are now closed, in response to the action of relay 48, thus opening valves 23 and 24 and 25. The unit under charge, the vacuum pump 16a and the manometer 21 are then connected to manifold 38. In addition, a switch shown at 75 is closed, energizing solenoid 28a through the upper closed contacts 53a of relay 53, and connecting the lubricant supply tank through valve 28 to the lubricant receptacle 20. It will be recalled that the lubricant chamber 20 has previously been evacuated and lubricant is therefore drawn into this chamber, with the manifold 38 and the unit held evacuated—valve 26 being closed. A switch shown at 76 is also closed by the operation of relay 48, thus closing the circuit through the second set of normally closed contacts 53b of relay 53 and the stepping winding 77, to the line. This circuit energizes the above-mentioned scale switch 22a. As shown in Figure 1, the receptacles 19 and 20 are mechanically supported upon the scale 22 in such manner that the scale switch contacts 22a are closed as soon as a sufficient weight of lubricant has been drawn into the chamber 20. To this end, the receptacles are rigidly interconnected, as by means of the pipe shown extending therebetween, thus providing a unitary assembly which may bear against the scale 22. Vertical reciprocation of the assembly is accommodated by a pair of flexible hose sections $h$—$h$, the solenoid 29a of course remaining in association with valve 29.

As clearly appears in Figure 3, the indicating arm of scale 22 is provided with a spider carrying a plurality of small magnets, shown at $M_1$ to $M_8$, inclusive, which are brought successively into registry with the switch contacts 22a, as the scale arm rotates clockwise. The scale switch is of known type, including one fixed and one movable contact (22b and 22c, respectively), housed in a dust-resistant envelope. Any of the small magnets is effective to close contacts 22a, when brought into registry therewith. The magnet $M_1$ is brought into such registry when the proper weight of lubricant has been delivered to the receptacle 20, the other magnets being utilized in preselection of the desired quantity of the refrigerant, in the manner explained hereinafter.

Closing of the contacts of scale switch 22a, by magnet $M_1$, operates stepping winding 77 to move arm 44 from the "off" position (N) to the first position ($Z_1$). This places relay 53 across the line, causing said relay to open those of its contacts which were previously closed. The upper contact 53a, now opened, was holding valve 28 open and, upon closing, valve 28 terminates the supply of lubricant to receptacle 20. The contacts 53b, are now opened, these being the contacts employed to energize the stepping winding 77. Upon opening of this set of contacts 53b, a ratchet hook, shown at 79, is released, and it engages the next tooth of the ratchet whereby to provide for subsequent operation of the arm 44.

Relay 53 carries an additional pair of normally open contacts shown at 80, which are closed upon actuation of the relay. As they close, a lamp 81 is lighted to indicate to the operator that the point in the cycle has been reached when he should "pinch-off" by-pass tube 36 on the sealed unit. "Pinching-off" may, of course, be accomplished automatically, if desired, thus obviating the necessity of actuating the start button as later described.

Up to this time, evacuation of the unit took place through pipe 36, on the high side of the compressor, as well as through pipe 15, on the low side thereof. This was the case, in order that gas from the high side would not have to leak back through the valves or, alternatively, to traverse the capillary system before being evacuated. The pinching-off of pipe 36 is done to ensure that, during the next operation, when the lubricant is being delivered to the compressor, it will be delivered to the suction side and will not collect in the condenser 12. Upon operation of relay 53, the lower open contacts 53c are closed and a lamp, shown at 78, is lighted to indicate the fact that the oil has been weighed. Additionally, the line $L_2$ is connected through these contacts which energizes point $P_4$ on stepping switch 39 to move arms 41 and 42 to the fifth position.

In the fifth position of stepping switch 39 (points $P_5$ and $Q_5$) relay 49 is energized which, as will now be understood, closes contacts 82, 83 and 84 with which to connect the unit, the vacuum pump 16a and the manometer 21 to the manifold 38. In addition, switches shown at 85 and 86 are closed. Switch 85 places relay 54 and switch arm 43 in circuit. This circuit, however, is not yet completed, across the line, since arm 44 has not yet reached a contact point which will permit the circuit to be closed through arm 43, relay 54 and contact 85. Arm 43 is manually adjusted, prior to the charging operation, and may rest on any one of the several contact points shown. Each of these contact points corresponds to a different predetermined weight on the scale shown in Figure 3, and the contact point appropriate to the type of unit being charged is manually selected before charging commences. The scale switch 22a is so included in the circuit that, assuming for example that the amount of refrigerant desired corresponds to the illustrated position of arm 43, the indicating hand of the scale will rotate clockwise until magnet $M_5$ is brought into registry with the scale switch contacts 22b and 22c.

Closing of switch 85 additionally energized the upper set of normally closed contacts 54a of relay 54, and in this way opened the valve 27 through operation of solenoid 27a. The refrigerant, under pressure in line 17, is thus connected to the previously evacuated receptacle 19. As the refrigerant fills the receptacle, the scale arm is rotated clockwise and the indicating hand of the scale also rotates clockwise until the next of the magnets associated with the scale arm is brought into registry with the scale switch contacts 22b and 22c. The resultant closing of scale switch 22a, under those circumstances, completes the circuit through switch 86, contacts 54b and stepping winding 77, thereby causing hook 79 to rotate switch arm 44 one step. Arm 44 had previously been resting on contact point $Z_1$ as a result of the previous operations described above, and is thus moved to contact point $Z_2$. For purposes of explanation, it is assumed that switch arm 43 had been manually set to a position other than that connected to contact point $Z_2$. Under these circumstances, the closure of switch 22a, by passage of the magnet, is ineffective to produce any result other than causing arm 44 to step up one more position.

This series of operations, just described, takes place each time one of the magnets $M_2$ to $M_8$ passes switch contacts 22b and 22c until the proper predetermined weight of refrigerant is delivered to receptacle 19, that is, until the magnet $M_5$, which corresponds in number with the manually adjusted position of arm 43, is reached, and the arm 44 comes to rest on a contact point connected to arm 43 (position $Z_5$, as illustrated). When this point has been reached, the circuit is closed from line $L_2$ through contact 85, relay 54, arm 43, arm 44 and back to the line $L_1$. Relay 54 then operates to transfer the contacts controlled thereby, thus preventing further operation of the stepping switch 77, and closing valve 27 to stop the further flow of refrigerant. As the flow of refrigerant ceases, relay 54 closes its normally open contact 54c thereby lighting a pilot lamp 87 to indicate that the refrigerant has been weighed. As shown in Figure 2, each of the relays 24a, 27a and 28a, and 45, 47, 50 and 51, is provided with a lamp adapted to indicate the energization of the associated relay. While these lamps assist the operator in determining the condition of the charging apparatus, detailed consideration of the use thereof is not necessary to a full understanding of the present invention. The normally open contact 54c, when closed, energizes point $P_5$ on switch 39 causing it to step to the sixt position.

The operation which takes place with the apparatus in the six position is as follows: Switches 68, 69 and 70 are closed, due to the energization of relay 46, thereby connecting the unit, the vacuum pump and the manometer to the manifold 38. When the evacuation is sufficiently complete, the pressure switch 33 is closed and the indicating lamp 88 is illuminated. In this way the operator is advised that he may push button 60 to initiate further automatic operation of the cycle. This button is actuated after he has pinched off the by-pass pipe 36, in response to illumination of the pinch-off lamp 81, as above indicated. When the apparatus is in this position and the operator so actuates start button 60, he closes the circuit through the arm 41 and through stepping winding 64 thereby moving the relay 39 to the next position, that is, to the position indicated by points $P_7$ and $Q_7$. At this time, starting switch 60 also closes the circuit to the above-mentioned timer 65.

In the seventh position, arms 41 and 42 are on their seventh set of contact points ($P_7$, $Q_7$), and the charging of the unit with lubricant and refrigerant is initiated. Relay 50 is energized, which closes switches 89, 90 and 91. Switch 89 then starts operation of timing motor 92 and switches 90 and 91 actuate valves 23 and 26 connecting the unit and the oil receptacle 20 to the manifold. Timer 65, operation of which has previously been started by manipulation of starting switch 60, closes switches 66 and 93 and holds them closed for one complete cycle of operation of timer 65. For convenience in illustrating the electrical circuits, the timer-controlled switches are shown as physically removed from the timer motors, appropriate mechanical linkages being illustrated by means of the conventional dashed line representation. The contacts of switch 66 supply current to timer 65, after the starting button 60 is released. The contacts of switch 93 energize solenoid 29a which opens the valve 29, momentarily, between the Freon chamber 19 and the oil chamber 20. The manifold—having previously been evacuated—is now connected to the lubricant receptacle 20 and to the receptacle 19, which latter contains refrigerant under pressure. The refrigerant pressure drives the lubricant through the manifold and the processing valve 30, into the unit being charged. Because the by-pass pipe 36 has been pinched-off, all of the oil thus delivered to the unit is driven into the suction side of the compressor where it is available to lubricate the compressor.

It should be noted that timer 92 operates somewhat differently than does timer 65. Timer 92 closes the switch contacts 94 momentarily after it has completed its timing cycle. This timing cycle is made long enough to assure that sufficient oil to lubricate the compressor has been injected into the unit. When switch 94 is closed the stepping winding is energized, through arms 41, and stepping relay 39 is advanced to the eighth contact position. Again, and as indicated with respect to timer 65, timer 92 is of known type, and further and more detailed description thereof is not necessary to an understanding of this invention. In this instance also, a timer supplied by the Eagle Signal Co. (No. HA12A6-B212) may be used.

In the eighth position, in which operation of the compressor is initiated and the residual refrigerant is drawn into the unit, relay 51 is energized by arm 42, and switches 95, 96, 97 and 98 are closed. As a result, valves 23, 26 and 29 are held open so that the receptacle 19, with its remaining refrigerant under pressure, is connected through the manifold 38 to the unit. At the same time, power cord 37 of the motor compressor is energized through a switch 98 and plug 37a, in series with an automatic overload circuit breaker 37b. The motor compressor now commences to run and is lubricated by the oil previously supplied during the seventh operation. The operation of the motor compressor is such as to draw in any lubricant or refrigerant remaining in the receptacles and in the manifold 38, and drives the refrigerant into the condenser 12, where it is compressed against the resistance of capillary tube 13. In this way the high pressure side of the unit will contain refrigerant under the normal high pressure and the suction line 15 and the manifold 38 will be evacuated to the normal pressure of the suction line. Pressure switch 35 is connected to the manifold and responds to the pressure therein. When the pressure is reduced to a predetermined value, the pressure switch 35 closes and energizes stepping winding 64 to operate stepping relay 39. This drives the stepping relay arms 41 and 42 to the ninth position, designated $P_9$ and $Q_9$ in Figure 2.

As soon as the arms arrive in the ninth position, relay 52 is energized. Energization of relay 52 closes the contacts of switches 99, 100 and 101, and opens those of switch 62. Another switch, appearing at 102, is closed in all positions of stepping relay 39 with the exception of the first position thereof, when it is opened by a cam appearing at 103. Relay 52 was initially actuated by arm 42 when it reached the ninth position and, while arm 42 is being returned to its initial position, relay 52 is held energized through contacts 102 and 100. Contacts 101 now energize relay winding 104 thus operating a release arm 105 to release the pawl 106 from stepping relay 39. Stepping relay 39 is then returned to its initial position, under the influence of a spring (not shown). In returning to its initial position, arm 41 passes over various contact points which may be energized and this operation might actuate stepping winding 64. To prevent this, switch 62 is held open while relay 52 is energized. It is unnecessary to provide additional, normally closed contacts in series with arm 42, as the various relays and contacts energized by this arm in returning to its initial position are sufficiently slow-acting to be substantially unaffected by this operation. Switch 99 was also closed by relay 52, thus energizing release windings 107, 108 and 109. to restore selector 40, relay 53 and relay 54 to initial position. Contacts 111 on the shaft of stepping switch 40 are held open by a cam 110 in the initial position (N) of arm 44. They are closed in all other positions of arm 44 including the position at the termination of the cycle. Relay 52 is deenergized when arm 41 returns to normal, as a result of the opening of switch 102. Along with such deenergization, windings 107, 108 and 109 are deenergized.

It will now be evident that the charging of the unit is complete, and that the charge of lubricant and refrigerant is in that portion of the unit which it would occupy, after the unit had been turned off by the usual thermostat. All of the solenoid valves are closed, including valve 23 connecting the unit to the manifold. The operator now closes valve 30 to seal the unit, which may then be disconnected from the charging board by disconnecting it from pipe 31, and the charging apparatus is now ready to repeat the above-described sequence of operations, in conjunction with another refrigeration unit.

From the foregoing description, it will be understood that the present invention provides for charging of refrigeration apparatus, and the like, in a rapid, accurate and automatic manner, and that the system is such that the operator need exercise a minimum of control during the charging sequence.

While a preferred embodiment has been illustrated and described herein, it is evident that the invention is susceptible of changes and modifications without departing from the essential spirit thereof. For example, in the broader aspect, it is within the purview of the invention to modify the apparatus in such manner that other instrumentalities may be employed in place of the electromechanical control system shown and described. However, it will be understood that such changes and modifications are contemplated as may come within the terms of the appended claims.

I claim:

1. In apparatus for charging refrigeration systems, receptacle means, means adapted to supply to said receptacle means charge constituents, means for measuring the quantity of constituents supplies, apparatus automatically responsive to supply of predetermined quantities of said constituents to provide for delivery of said constituents to an associated system being charged, and instrumentalities adapted to initiate operation of the associated system to draw residual portions of said constituents from the receptacle means and into the system.

2. In apparatus for charging refrigeration systems, receptacle means, means adapted to supply to said receptacle means—in a predetermined sequence—two different charge constituents, means for measuring the quantity of constituents supplied, electromechanical apparatus controlled by said measuring means and automatically responsive to supply of a predetermined quantity of one constituent to terminate supply of said one constituent and to initiate supply of the other constituent, said electromechanical apparatus being responsive to supply of a predetermined quantity of the said other constituent to terminate supply of the said other constituent and adapted to establish communication between said receptacle means and an associated system being charged, whereby to provide for delivery of said constituents to the system, and means adapted to initiate operation of the system to draw residual portions of said constituents from the receptacle means and into the associated system.

3. In apparatus for charging refrigeration systems, receptacle means, means adapted to supply to said receptacle means—in a predetermined sequence—two different charge constituents, means for measuring the quantity of constituents supplied, apparatus controlled by said measuring means and automatically responsive to supply of a predetermined quantity of one constituent to terminate supply of said one constituent and to initiate supply of the other constituent, said last-mentioned apparatus being responsive to supply of a predetermined quantity of the said other constituent to terminate supply of the said other constituent and to establish communication between said receptacle means and the system, whereby to provide for delivery of said constituents to an associated system being charged, means adapted to initiate operation of the system to draw residual portions of said constituents from the receptacle means, and pressure-responsive switch means effective to terminate operation of such system when the pressure therein has reached a predetermined value.

4. In apparatus for charging refrigeration systems, a pair of receptacles, means adapted to supply to said receptacles charge constituents consisting of lubricant and vaporizable fluid refrigerant, the construction and arrangement being such that each constituent is supplied exclusively to one of said receptacles, and electromechanical means responsive to completion of the supply of predetermined quantities of said constituents and adapted to establish communication between said receptacles and between the lubricant receptacle and an associated system being charged, the establishment of such communication serving also to decrease the pressure in the receptacle containing said vaporizable fluid refrigerant thus permitting volatilization of said refrigerant and providing for delivery of said lubricant to the system under the influence of the pressure created by volatilization of the refrigerant.

5. Charging apparatus in accordance with claim 4, further characterized in that said electromechanical means includes valve structure automatically operable to establish the said communication between said receptacles and to maintain said communication for a predetermined short period of time.

6. In apparatus for charging refrigeration systems, a pair of receptacles, means adapted to supply to said receptacles—in predetermined sequence—charge constituents consisting of lubricant and vaporizable fluid refrigerant, the construction and arrangement being such that each constituent is supplied exclusively to one of said receptacles, and means responsive to supply of a predetermined quantity of the last constituent supplied and adapted to establish communication between said receptacles and between the lubricant receptacle and an associated system being charged, the establishment of such communication serving also to decrease the pressure in the receptacle containing said vaporizable fluid refrigerant thus permitting volatilization of said refrigerant and providing for delivery of said lubricant to the system under the influence of the pressure created by volatilization of the refrigerant.

7. In apparatus for charging refrigeration systems, a pair of receptacles, means adapted to supply to said receptacles—in predetermined sequence—charge constituents consisting of lubricant and vaporizable fluid refrigerant, the construction and arrangement being such that each constituent is supplied exclusively to one of said receptacles, and means responsive to supply of a predetermined quantity of one constituent to terminate supply of said one constituent and to initiate supply of the other constituent, said means further being responsive to supply of a predetermined quantity of the said other constituent and adapted to terminate supply thereof and to establish communication between said receptacles and between the lubricant receptacle and an associated system being charged, the establishment of such communication serving also to decrease the pressure in the receptacle containing said vaporizable fluid refrigerant thus permitting volatilization of said refrigerant and providing for delivery of said lubricant to the system under the influence of the pressure created by volatilization of the refrigerant.

8. In apparatus for charging refrigeration systems, a pair of receptacles, means adapted to supply to said receptacles—in a predetermined sequence—charge constituents consisting of lubricant and vaporizable fluid refrigerant, the construction and arrangement being such that each constituent is supplied exclusively to one of said receptacles, and electromechanical means responsive to supply of a predetermined quantity of the last constituent supplied and including valve structure operable to establish communication between said receptacles for a short period of time and concurrently therewith to establish communication between the lubricant receptacle and an associated system being charged, the establishment of such communication serving also to decrease the pressure in the receptacle containing said vaporizable fluid refrigerant thus permitting volatilization of said refrigerant and providing for delivery of said lubricant to the system under the influence of the pressure created by volatilization of the refrigerant.

9. Charging apparatus in accordance with claim 8, and further including electrical circuits adapted to initiate operation of the associated system after the said introduction of the lubricant, whereby to draw residual vaporizable refrigerant from said receptacles and into the associated system.

10. Charging apparatus in accordance with claim 9, and further including pressure-responsive switch means adapted to terminate the said operation of the refrigeration system when a predetermined low pressure has been reached within the system.

11. In apparatus for charging refrigeration systems, receptacle means, means effective to evacuate said receptacle means, means responsive to completion of said evacuation to initiate evacuation of an associated system being charged, means adapted to supply to said receptacle means—in a predetermined sequence—two different charge constituents, means for measuring the quantity of constituents supplied, electromechanical apparatus controlled by said measuring means and including switch means automatically responsive to supply of a predetermined quantity of one constituent to terminate supply of said one constituent and to initiate supply of the other constituent, said switch means further being responsive to supply of a predetermined quantity of the said other constituent to terminate supply of the said other constituent and thereafter to establish communication between said receptacle means and an associated system being charged, means adapted to initiate operation of the system to draw residual portions of said constituents from the receptacle means and into the associated system, and pressure-responsive switch means adapted to terminate operation of the system when the pressure therein has reached a predetermined value.

12. In apparatus for charging refrigeration systems, a manifold to which may be coupled an associated system to be charged, receptacle means adapted to be placed in communication with said manifold, a source of lubricant, a source of refrigerant, each of said sources adapted to be placed in communication with said receptacle means, and apparatus including valve means automatically operable to establish communication between one of said sources and said receptacle means and thereafter to establish communication between the other of said sources and said receptacle means, said apparatus and valve means further being responsive to supply of predetermined quantities of said constituents to said receptacle means to terminate supply of said constituents to said receptacle means and to establish communication between said receptacle means and said manifold, whereby to provide for delivery of said constituents to the associated system.

13. A construction in accordance with claim 12, in which said last-mentioned apparatus includes means for weighing the constituents supplied, said construction being further characterized in that supply of said constituents is under the control of said weighing means and communication between said receptacle means and said manifold is established in response to supply of predetermined constituent weights to said receptacles.

14. In apparatus for charging refrigeration systems, a manifold to which may be coupled an associated system to be charged, a pair of receptacles each adapted to be placed in communication with said manifold, a source of lubricant, a source of vaporizable fluid refrigerant, means for establishing communication between said sources and said receptacles whereby to deliver the lubricant and refrigerant to corresponding separate receptacles, and apparatus including valve means responsive to supply of predetermined quantities of said constituents to said receptacles to terminate said last-mentioned communication and to establish communication between said receptacles and between the lubricant receptacle and said manifold, the establishment of such communication serving also to decrease the pressure in the receptacle containing said vaporizable fluid refrigerant thus permitting volatilization of said refrigerant and providing for delivery of said lubricant to the associated system under the influence of the pressure created by volatilization of the refrigerant.

MALCOLM G. SHOEMAKER.

REFERENCES CITED

The following references are of record in the file of this patent:

UNITED STATES PATENTS

| Number | Name | Date |
| --- | --- | --- |
| 1,415,399 | Robinson | May 9, 1922 |
| 1,815,962 | Andrews | July 28, 1931 |
| 2,140,811 | Poole | Dec. 20, 1938 |
| 2,181,853 | McCloy | Nov. 28, 1939 |
| 2,425,844 | Spaulding | Aug. 19, 1947 |